(12) United States Patent
Goh et al.

(10) Patent No.: US 9,207,115 B2
(45) Date of Patent: Dec. 8, 2015

(54) MULTI-WAVELENGTH FLAME SCANNING

(71) Applicant: Honeywell International Inc., Morristown, NJ (US)

(72) Inventors: Joseph S. F. Goh, Noblesville, IN (US); Chad Carty, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 10 days.

(21) Appl. No.: 14/204,815

(22) Filed: Mar. 11, 2014

(65) Prior Publication Data

US 2015/0260568 A1 Sep. 17, 2015

(51) Int. Cl.
*G01J 1/42* (2006.01)
*G01J 1/04* (2006.01)

(52) U.S. Cl.
CPC . *G01J 1/0477* (2013.01); *G01J 1/42* (2013.01)

(58) Field of Classification Search
USPC ............... 356/135, 51; 250/430, 353, 339.15, 250/227.2, 554, 226; 431/75, 12, 14, 79
See application file for complete search history.

(56) References Cited

U.S. PATENT DOCUMENTS

| | | | | |
|---|---|---|---|---|
| 2,804,131 | A * | 8/1957 | Ator ................................ | 431/79 |
| 4,435,149 | A * | 3/1984 | Astheimer ....................... | 431/12 |
| 4,555,800 | A * | 11/1985 | Nishikawa et al. ........... | 382/203 |
| 4,578,583 | A * | 3/1986 | Ciammaichella et al. .... | 250/372 |
| 4,708,674 | A * | 11/1987 | Matsumoto ................... | 440/88 L |
| 4,983,853 | A * | 1/1991 | Davall et al. .................. | 250/554 |
| 5,107,128 | A * | 4/1992 | Davall et al. .................. | 250/554 |
| 6,268,913 | B1 * | 7/2001 | Rising ........................... | 356/326 |
| 6,914,246 | B2 * | 7/2005 | Servaites et al. ......... | 250/339.15 |
| 7,289,032 | B2 | 10/2007 | Seguin et al. | |
| 7,728,736 | B2 * | 6/2010 | Leeland et al. .............. | 340/578 |
| 8,153,952 | B2 | 4/2012 | Haffner | |
| 8,371,102 | B1 * | 2/2013 | Lee et al. .................... | 60/39.281 |
| 2004/0266018 | A1 | 12/2004 | Ogasawara | |
| 2006/0133714 | A1 * | 6/2006 | Sappey et al. .................. | 385/13 |
| 2008/0050684 | A1 * | 2/2008 | Flynn et al. .................... | 431/12 |
| 2009/0152479 | A1 * | 6/2009 | Braendle ....................... | 250/554 |
| 2009/0289178 | A1 * | 11/2009 | Haffner ..................... | 250/227.2 |
| 2010/0330516 | A1 * | 12/2010 | Haffner .......................... | 431/75 |
| 2011/0279828 | A1 * | 11/2011 | Matsumoto et al. .......... | 356/630 |
| 2012/0235042 | A1 * | 9/2012 | Cole et al. .................... | 250/340 |

OTHER PUBLICATIONS

Spectroscopic Methods. Spectroscopy Chapter 3. Retrieved from http://web.njit.edu/~kebbekus/analysis/3SPECTRO.htm on Oct. 13, 2013. 31 pages.

* cited by examiner

*Primary Examiner* — Sang Nguyen
(74) *Attorney, Agent, or Firm* — Brooks, Cameron & Huebsch, PLLC

(57) ABSTRACT

Methods and systems are described herein. One method includes scanning, using a sensor, a first wavelength range of refracted light emitted from a flame, revising a position of a prism and/or the sensor based on the scan of the first wavelength range, and scanning, using the sensor after revising the position of the prism and/or the sensor, a second wavelength range of refracted light emitted from the flame.

20 Claims, 3 Drawing Sheets

MULTI-WAVELENGTH FLAME SCANNING

TECHNICAL FIELD

The present disclosure relates to methods and systems for multi-wavelength flame scanning.

BACKGROUND

An operator of a furnace may have to know the furnace internal conditions in order to control furnace settings and/or to achieve a threshold efficiency. For instance, an accurate understanding and/or estimate of an intensity of a flame in the furnace can be used to determine if the combustion process of the furnace is operating appropriately. A flame scanner can be used to monitor the combustion process of a furnace to provide a signal indicating the intensity of a flame in the furnace.

An objective of monitoring a combustion process can be to monitor the process and avoid instabilities of the flame. For instance, the monitoring of the combustion process can improve system performance, reduce levels of harmful emissions, and/or extend the stability domain by reducing oscillations induced by coupling between resonance modes and combustion, among other benefits.

Conventional flame scanners may produce an electrical signal based upon a monitored flame. This electrical signal can be transmitted to processing electronics that are housed separately from the flame scanner. Such flame scanners typically scan light emitted in a fixed wavelength range.

In some instances, however, furnaces, such as industrial furnaces, can have combustion processes that produce flames at a variety of wavelength ranges. For example, the wavelength range of the flame that is monitored may change depending on the particular time of day and/or combustion process being performed.

DETAILED DESCRIPTION

Figure 1:
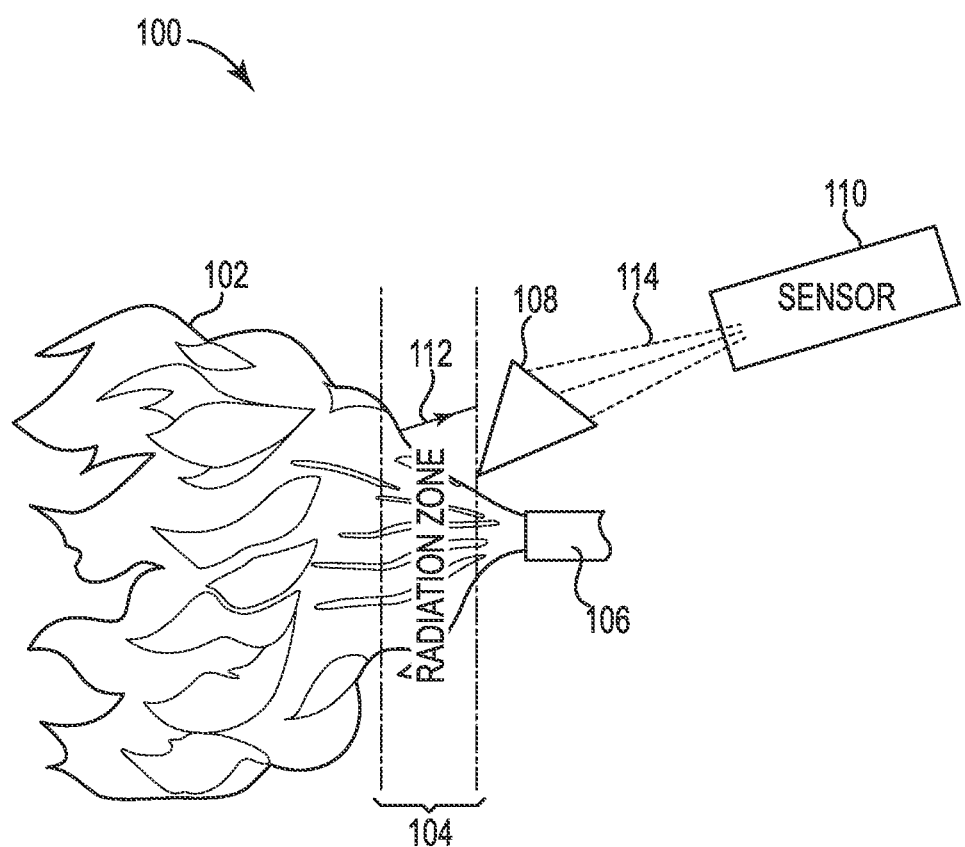
FIG. 1 illustrates an example of a flame scanner system in accordance with one or more embodiments of the present disclosure.

Methods and systems for multi-wavelength flame scanning are described herein. For example, one or more method embodiments can include scanning, using a sensor, a first wavelength range of refracted light emitted from a flame, revising a position of a prism and/or the sensor based on the scan of the first wavelength range, and scanning, using the sensor after revising the position of the prism and/or the sensor, a second wavelength range of refracted light emitted from the flame.

Monitoring the combustion process of a furnace can prevent instabilities in the flame while increasing system performance. As such, a flame scanner should be as reliable as possible, should allow the determination of as many possible parameters of flame as possible, and should be resistant to typical (e.g., high) temperatures around the flames.

Prior approaches for flame scanning of a furnace can include using a sensor that is a passive device that records light emissions within the combustion chamber. For instance, the sensor can produce an electrical signal based upon a monitored flame. This resulting electrical signal is transmitted to processing electronics that are housed separately from the sensor, typically in an equipment rack located adjacent to a control room. The strength of the produced signal is typically proportional to the intensity of the monitored flame.

However, such sensors may only be able to scan light emitted in a fixed wavelength range, including visible, infrared (e.g., short, medium, and/or long wave), and/or ultraviolet. Thus, prior approaches may be limited to applications of furnaces that operate in the fixed wavelength range of the flame scanner and may not be applicable to furnaces that burn at multiple wavelength ranges (e.g., that have signal variability).

In contrast, embodiments in accordance with the present disclosure can include methods and systems for multi-wavelength flame scanning that can determine a threshold intensity of the flame based on intensities observed across multiple wavelength ranges and/or can revise the determined threshold intensity over time. For example, a prism can be used to refract light emitted from a flame at a wavelength range. A sensor can scan the refracted light and convert the scanned light to a plurality of signals, each signal corresponding to a portion of the wavelength range (e.g., a wavelength and/or a sub-range of the wavelength range).

The portion of the wavelength range with the highest intensity (e.g., a first threshold intensity) can be the strongest intensity (e.g., portion with the strongest intensity) of the range. Based on the determined highest intensity, the position of the prism and/or the sensor can be revised, resulting in a revised wavelength range of light emitted from the prism. The sensor can determine the highest intensity of the revised wavelength range. In some embodiments, the revision of the position and determination of the highest intensity can be iteratively repeated to determine a threshold intensity.

Alternatively and/or in addition, embodiments of the present disclosure can include a number of sensors. Each of the number of sensors can be configured to scan light emitted in a particular wavelength range. One of the sensors can be used to scan signal intensities, for instance, in response to a highest intensity of scan (e.g., from a different sensor) corresponding to a wavelength within a past scan.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the some embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be reference by 208 in FIG. 2.

As used herein, "a" or "a number of" refers to one or more. For example, "a number of sensors" can refer to one or more sensors.

FIG. 1 illustrates an example of a flame scanner system 100 in accordance with one or more embodiments of the present disclosure. The flame scanner system 100 can include a sensor 110 and a prism 108. A sensor 110, as used herein, can include any suitable image sensor or camera device. In some embodiments, the sensor 110 can be a video camera and video analytics can be performed on the captured images. The sensor 110 can include a thermographic camera and/or video device, and/or an infrared camera and/or video device, among other components.

For instance, the sensor 110 can be used to scan light 112 emitted from a flame 102. The light 112 emitted from the flame 102 can be emitted during a combustion process of a furnace, for example. The combustion process can include a variety of gases, solids, and/or liquids, of a variety of material. Light 112 emitted from the flame 102 can include flame radiation. The flame radiation can be scanned from a particular zone of the flame, such as the radiation zone 104 illustrated in FIG. 1.

The flame 102, in some embodiments, can vary over time. For example, particular furnaces (e.g., industrial furnaces) may have combustion processes that vary over time due to the nature of material involved in the combustion process. The varying combustion process may, for example, include a variety of temperatures for the combustion process over time. In such an instance, monitoring the combustion process and/or the flame 102 may require monitoring the flame across a variety of wavelength ranges.

The sensor 110 can monitor the flame 102 using a prism 108. As illustrated by the embodiment of FIG. 1, the prism 108 can be located (e.g., positioned) between the flame 102 and the sensor 110. Light 112 emitted from the flame 102 (e.g., in the radiation zone 104) can be refracted using the prism 108. For instance, depending on the position (e.g., distance to the sensor 110) of the prism 108 and/or the sensor 110, the prism 108 can refract light in a particular wavelength range 114. The refracted light in the particular wavelength range 114 can be scanned by the sensor 110 to determine a threshold intensity of the wavelength range 114 (e.g., a particular wavelength and/or portion of the wavelength range with the highest intensity).

For example, the energy of flame radiation can be dependent on wavelength and frequency of the radiation. Wavelength can include the distance measured from the maximum of one wave to the next and frequency can include the number of oscillations passing a point in a specific time interval. The wavelength can change depending on matter through which the wave passes. The wave properties of light lead to the phenomena of dispersion and interference, which can be used to select particular wavelength ranges.

When a beam of radiation is passed through a prism 108, the light beam is deflected as it passes from air into glass and back again. The deflection is due to the difference between refractive index of the two media. Further, the refractive indices differ with the wavelength of light. For example, red radiation is bent through a different angle than green radiation. The different wavelengths are focused at different points in space and can be observed sequential (e.g., scanned) by moving either the prism 108 or the sensor 110.

As further discussed herein, the position of the prism 108 and/or the sensor 110 can be revised to change the wavelength range scanned by the sensor 110. For instance, the wavelength range can be changed from a first wavelength range to a second wavelength range. The first and second wavelength ranges can be non-overlapping, or alternatively, the ranges can be overlapping. In some embodiments, the wavelength ranges can be overlapping by a threshold wavelength (e.g., 1, 2, 10, etc., nanometers (nm)).

Sensor 110 can scan a first wavelength range of refracted light of flame 102. A first wavelength range, as used herein, can include a wavelength range of refracted light of a particular range (e.g., a wavelength range). The light 112 emitted from the flame 102 can be refracted, for instance, using prism 108, as discussed further herein.

In some embodiments, the sensor 110 can determine a first threshold intensity from the first wavelength range (e.g., wavelength range 114) of refracted light of flame 102. The first threshold intensity, as used herein, can include a strongest (e.g., highest) intensity of a number of portions of the first wavelength range (e.g., a number of wavelengths and/or sub-ranges within the first wavelength range). In some embodiments, determining a first threshold intensity can include identifying a wavelength within the first wavelength range with the strongest intensity.

An intensity of a wavelength range, as used herein, can be proportional to a signal intensity output from the sensor 110. For instance, the sensor 110 can monitor refracted light in the first wavelength range (e.g., wavelength range 114). In some embodiments, the monitoring can include scanning a wavelength range 114 by moving the sensor 110 through the spectrum of the wavelength range 114 to scan the refracted light (e.g., radiation). Alternatively, the monitoring can include scanning the wavelength range 114 using the sensor 110 while and/or after rotating the prism 108 through the spectrum of the wavelength range 114 to scan the refracted light. The rotation can, for instance, include a circular motion about an axis (e.g., rotating the prism 108 about an axis).

The refracted light scanned by the sensor 110 can be converted to a signal (e.g., an electrical signal). Each portion of the wavelength range 114 can have an intensity (e.g., strength) of the signal. The portion of the wavelength range 114 with the strongest signal can be determined based on the signal intensities.

For instance, the position of the prism 108 and/or the sensor 110 can be revised based on the scan of the first wavelength range. For example, the position can be revised based on a first threshold intensity of the first wavelength range. Revising a position of the prism 108 and/or the sensor 110 can, for instance, include revising a distance (e.g., increase or decrease) between the prism 108 and the sensor 110. For instance, the first threshold intensity may identify that the portion of the first wavelength range (e.g., a wavelength) with the strongest signal is at the edge of the wavelength range (e.g., the top or bottom wavelength). The position of the prism 108 and/or the sensor 110 can be revised to change the wavelength range scanned by the sensor to a second wavelength range. For instance, the wavelength range refracted by the prism 108 can depend on the distance of the prism 108 to the sensor 110.

Revising the position of the prism 108 and/or the sensor 110 can, in some embodiments, include moving the sensor 110 closer or farther to the prism 108. For instance, the sensor 110 can be moved in a horizontal or vertical direction relative to the prism 108. Alternatively and/or in addition, revising the position can include moving the prism 108 closer or farther to the sensor 110. For example, the prism 108 can be moved in a horizontal or vertical direction relative to the sensor 110.

Sensor 110 can scan a second wavelength range of refracted light. The second wavelength range, as used herein, can include a revised wavelength range from the wavelength range, first wavelength range, and/or a past scan. The second wavelength range can, for instance, be non-overlapping with the first wavelength range or can be overlapping. For example, if the wavelength ranges overlap, the portion of the first wavelength range with the first threshold intensity may be within the first wavelength range and the second wavelength range.

According to some embodiments of the present disclosure, sensor 110 can determine the second threshold intensity of the second wavelength range. The second threshold intensity, as used herein, can include a revised intensity from the first threshold intensity and/or a past scan. For example, determining the second threshold intensity, similarly to the first threshold intensity, can include identifying a portion of the second wavelength range (e.g., a wavelength within and/or a sub-range within the second wavelength range) with the strongest intensity based on converted signals from the sensor 110.

In some embodiments, the system 100 can include a number of sensors. For instance, a first sensor can scan light refracted within the first wavelength range and a second sensor can scan light refracted with the second wavelength range, as discussed further herein.

In accordance with some embodiments of the present disclosure, the position of the prism 108 and/or the sensor 110 can be iteratively revised. In some embodiments, the iterative revision can be used to iteratively determine a revised threshold intensity of the flame over a period of time.

For example, a threshold intensity can be iteratively determined and the position of the prism 108 and/or the sensor 110 can be iteratively revised over the period of time. The iterative process can be used, for instance, to determine a threshold intensity of a flame (e.g., a furnace) with a combustion process that dynamically changes over the period of time. For instance, the combustion process may change over time due to involvement of different materials, different phases of material (e.g., gas, liquid, solids), and/or different temperatures, among other changes. The period of time can include, for example, a day, a week, and/or a month, etc. For instance, the combustion process may change for portions of the period of time (e.g., each hour, each day, bi-weekly, etc.).

Figure 2:
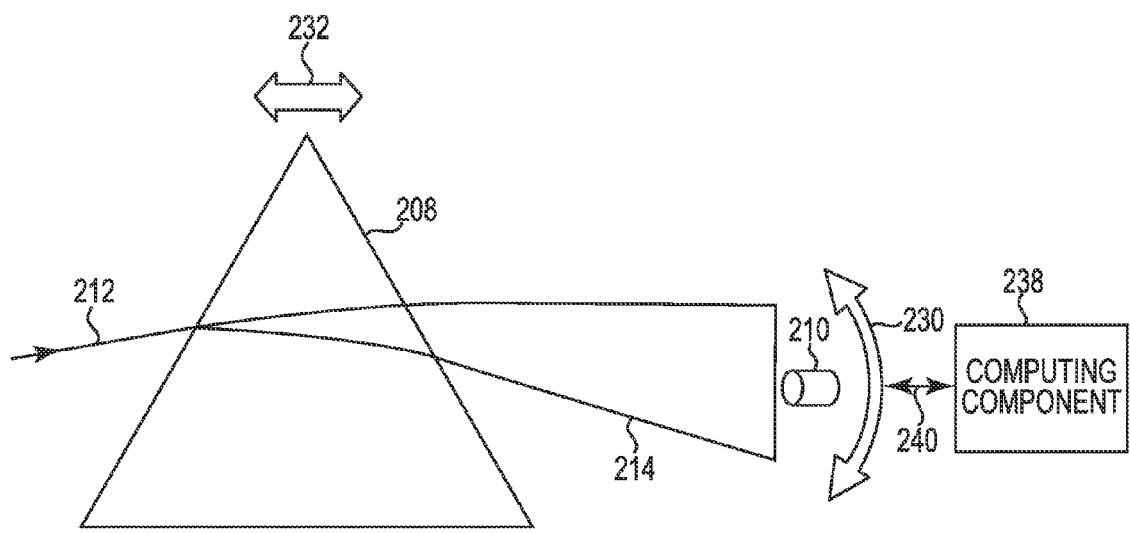
FIG. 2 illustrates an example of a process for multi-wavelength flame scanning in accordance with one or more embodiments of the present disclosure.

FIG. 2 illustrates an example of a process for multi-wavelength flame scanning in accordance with one or more embodiments of the present disclosure. The process can be performed, for instance, using a flame scanner system, such as flame scanner system 100 previously described in connection with FIG. 1.

A flame scanner system, as used herein, can include a prism 208, a number of sensors 210, and/or a computing component 238. Prism 208 and sensors 210 can be, for example, prism 108 and sensor 110 previously described in connection with FIG. 1.

Although not shown in FIG. 2 for clarity and so not to obscure embodiments of the present disclosure, the computing component 238 can include a memory and a processor coupled to the memory. The memory can be any type of storage medium that can be accessed by the processor to perform various examples of the present disclosure. For example, the memory can be a non-transitory computer readable medium having computer readable instructions (e.g., computer program instructions) stored thereon that are executable by the processor to perform various examples of the present disclosure.

The memory can be volatile or nonvolatile memory. The memory can also be removable (e.g., portable) memory, or non-removable (e.g., internal) memory. For example, the memory can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory. Further, the memory can be located in the computing component, or internal to another computing component (e.g., enabling computer readable instructions to be downloaded over the Internet or another wired or wireless connection).

As illustrated by FIG. 2, computing component 238 can be in communication with the number of sensors 210 and/or the prism 208 via a communication path 240. The communication path 240, in some embodiments, can include a wireless and/or wired communication between the computing component 238 and the sensors 210 and/or the prism 208. For instance, the communication path 240 can be such that the computing component 238 is remote from the sensors 210 and/or the prism 208 such as in a network relationship between the computing component 238 and the sensors 210 and/or the prism 208. That is, the communication path 238 can be a network relationship. Examples of such a network relationship can include a local area network (LAN), wide area network (WAN), personal area network (PAN), and the Internet, among others.

The prism 208, as illustrated by FIG. 2, can refract light 212 emitted from a flame (e.g., flame 102 previously described in connection with FIG. 1). For instance, the light 212 emitted from a flame can include radiance of the flame. The prism 208 can refract the input light 212 to output a wavelength range 214. For example, as illustrated by the embodiment of FIG. 2, the wavelength range 214 can include a spectrum.

The number of sensors 210 can scan the refracted light in the wavelength range 214. In some embodiments, a first sensor among the number of sensors 210 can scan the refracted light from the wavelength range 214 by moving 330 through the wavelength range 214. The movement 230 can include moving in a generally vertical direction with respect to the prism 208.

The number of sensors 210 (e.g., the first sensor) can convert the scanned refracted light into a signal for each of a number of portions of the wavelength range. The number of portions can, for instance, each include a wavelength of the wavelength range and/or a sub-range of the wavelength range. The signal for each portion of the wavelength range can, for example, include an electrical signal of a particular intensity.

The computing component 238, in some embodiments, can determine a threshold signal of the flame. For example, at least one of the number of sensors 210 can communicate one or more electrical signals that are proportional in intensity to the intensity of a portion of the wavelength range 214. The threshold intensity can, for example, include the strongest intensity among a number of portions of the wavelength range 214. The computing component 238 can iteratively determine a strongest intensity from the number of portions of the wavelength range 214 based on the converted signals of the number of portions. The intensity of the portions of the wavelength range 214 can, for example, be proportional to the signal intensity converted by the number of sensors 210.

In some embodiments, the computing component 238 can revise the position of the prism 208 and/or the number of sensors 210 based on the scan. For example, revising the position based on the scan can include revising the position based on the determined threshold intensity (e.g., the strongest intensity). The threshold intensity can, for example, identify a portion of the wavelength range 214 with the strongest intensity. In some instances, the strongest intensity may be at the edge of the wavelength range 214.

The revision can include the computing component 238 instructing a sensor among the number of sensors 210, the number of sensors 210, a prism 208, and/or a motor component associated with the sensors 210 or prism 208 to revise a position. The revised position of the sensor 210 and/or the prism 208 can, for example, result in refracted light from the prism 208 corresponding to a revised wavelength range (e.g., a second wavelength range).

For example, the revision of the position of the prism 208 and/or the number of sensors 210, in some embodiments, can include moving 232 the prism 208 in a horizontal or vertical direction. For example the horizontal or vertical direction, as used herein, can include a horizontal or vertical direction relative to the number of sensors 210. Based on the revised position of the prism 208, the prism 208 can refract light in a revised wavelength range.

For example, revising the position of the prism 208 and/or the number of sensors 210 can result in the prism 208 refracting light emitted from the flame in different wavelength ranges. For instance, the prism 208 can refract light emitted from the flame in the wavelength range 214 prior to the revised position of the prism 208 and/or the number of sensors 210 and refract light emitted from the flame in a revised wavelength range after the revised position of the prism 208 and/or the number of sensors 210.

The computing component 238 can determine a revised threshold intensity (e.g., a revised strongest intensity) from a number of portions of the revised wavelength range. For example, the number of sensors 210 and/or a second sensor among the number of sensors 210 can scan refracted light in the revised wavelength range and convert the scanned refracted light into a signal for each of the number of portions of the revised wavelength range. The computing component 238 can determine the revised threshold intensity from the number of signals of the number of portions of the revised wavelength range. The number of sensors 210 and/or the second sensor can, for instance, scan refracted light in the revised wavelength range after the position of the prism 208 and/or the number of sensors 210 is revised.

As discussed herein, in some embodiments, each sensor among the number of sensors 210 can be configured to scan light within a particular wavelength range 214. In such embodiments, the computing component 238 can instruct a first sensor (e.g., a single sensor) among the number of sensors 210 to scan refracted light in the wavelength range 214 (e.g., a first wavelength range) and instruct a second sensor among the number of sensors 210 to scan refracted light in the revised wavelength range (e.g., a second wavelength range). In such embodiments, the computing component 238 can revise the position of the second sensor (e.g., a single sensor) among the number of sensors 210, wherein the second sensor is configured to scan refracted light in a wavelength range corresponding to the threshold intensity (e.g., the strongest intensity of the wavelength range).

For instance, each of the number of sensors 210 can have a discrete wavelength range that a sensor can monitor. Example discrete wavelength ranges can include 10 nm-380 nm (e.g., corresponding to ultraviolet light), 380 nm-700 nm (e.g., corresponding to visible light), 700 nm-1000 nm (e.g., corresponding to infrared light), etc. Each sensor can scan a number of portions of the discrete wavelength range. For example, each portion of a discrete wavelength range can include a sub-range, for example 10 nm-30 nm.

In some embodiments, the revision of the position of the prism 208 and/or the number of sensors 210 can be based on determining which sensor among the number of sensors 210 can scan light corresponding to a wavelength range that the threshold intensity (e.g., strongest intensity) belongs to. For example, the computing component 238 can determine that a first sensor among the number of sensors 210 is configured to scan refracted light corresponding to the wavelength range and determine a second sensor among the number of sensors 210 is configured to scan refracted light in a wavelength range corresponding to the threshold intensity and/or the revised wavelength range. The instruction, from the computing component 238 to the first sensor and/or second sensor to scan a wavelength range, can be in response to the determination that the first sensor and/or second sensor is configured to scan light in the respective wavelength range.

The movement of the prism 208 and/or the number of sensors 210 can be accomplished using one or more motor components (e.g., not illustrated in FIG. 2). For example, the one or more motor components can include an actuator. An actuator, as used herein, can include a type of motor for moving or controlling a mechanism. A source of energy, such as an electric current, hydraulic fluid pressure, and/or pneumatic pressure, can be converted into motion. For example, the motor component can be instructed by the computing component 238 to move 232 the prism 208 in a horizontal or vertical direction relative to the number of sensors 210 to revise the position of the prism 208 and/or the number of sensors 210 based on the threshold intensity (e.g., strongest intensity). Alternatively and/or in addition, a motor component can be instructed by the computing component 238 to move 230 the sensor 210 through the wavelength range 214.

Figure 3:
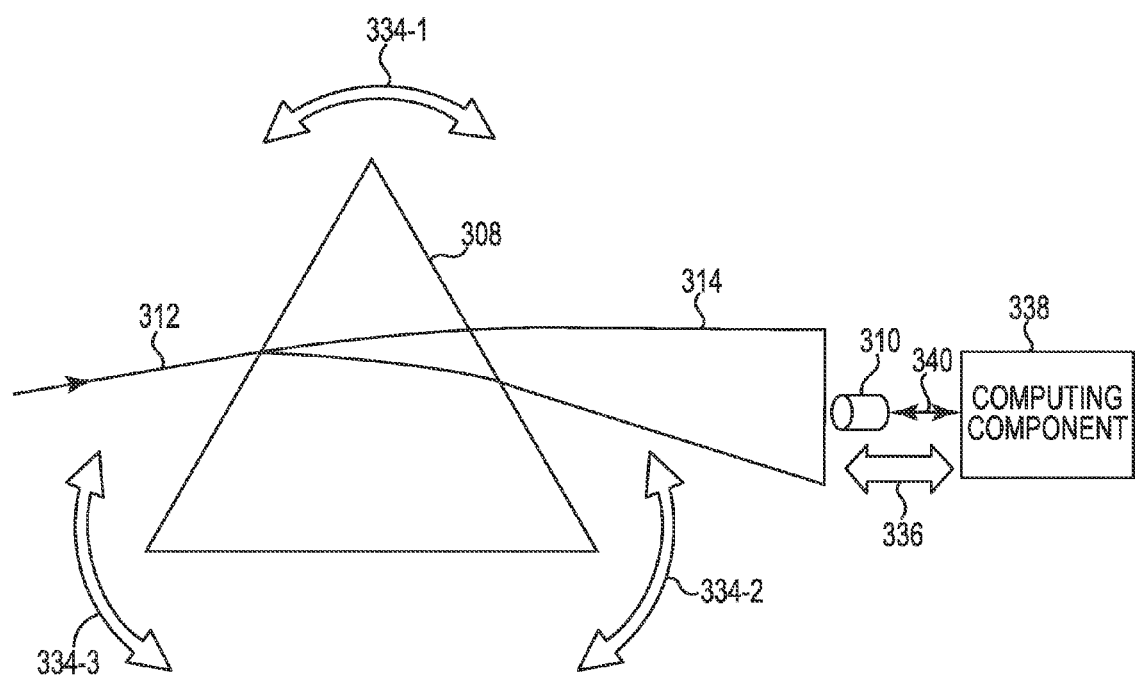
FIG. 3 illustrates an example of a process for multi-wavelength flame scanning in accordance with one or more embodiments of the present disclosure.

FIG. 3 illustrates an example of a process for multi-wavelength flame scanning in accordance with one or more embodiments of the present disclosure. The process can be performed, for instance, using a flame scanner system, such as flame scanner system 100 previously described in connection with FIG. 1.

A flame scanner system, as used herein, can include a prism 308, a number of sensors 310, and/or a computing component 338. Prism 308 and sensors 310 can be, for example, prism 108 and sensor 110 previously described in connection with FIG. 1. Computing component 338 can be, for example, computing component 238 previously described in connection with FIG. 2. As illustrated by FIG. 3, computing component 338 can be in communication with the sensor 310 and/or prism 308 via a communication path 340.

The prism 308, as illustrated by the embodiment of FIG. 3, can refract light 312 emitted from a flame (e.g., flame 102 previously described in connection with FIG. 1). For example, the light 312 emitted from a flame can include radiance of the flame. The prism 308 can refract the input light 312 to output a wavelength range 314. As illustrated by the embodiment of FIG. 3, the wavelength range 314 can include a spectrum.

The number of sensors 310 can, for example, scan the refracted light in the wavelength range 314 (e.g., prior to the position of the prism 308 and/or the number of sensors being revised). In some embodiments, a first sensor among the number of sensors 310 can scan the refracted light from the wavelength range 314 while and/or after the prism 308 is rotated 334-1, 334-2, 334-3 through the wavelength range 314. The rotation 334-1, 334-2, 334-3 can include rotating the prism 308 about an axis. The rotation can, for instance, include rotating the prism 308 through a spectrum of a wavelength range 314.

One or more of the number of sensors 310 can, for instance, scan through the wavelength range 314 while and/or after the prism 308 is rotated. The number of sensors 310 (e.g., the first sensor) can convert the scanned refracted light into a signal for each of a number of portions of the wavelength range 314.

The computing component 338 of the flame scanner system can iteratively determine a threshold intensity (e.g., strongest intensity) from the number of portions of the wavelength range based on the converted signals of the number of portions. The intensity of the portions of the wavelength range can, for example, be proportional to the signal intensity converted by the number of sensors 310. The iterative determination, in some embodiments, can include the computing component 338 iteratively repeating determining a threshold intensity of the flame based on the time of day, day of the week, and/or time of the year, among other times.

In some embodiments, the computing component 338 can revise a position of the prism 308 and/or the number of sensors 310 based the scan. For example, revising the position based on the scan can include revising the position based on the threshold intensity. The revised position can, for instance, revise the distance between the prism 308 and the number of sensors 310. The threshold intensity can, for example, identify a portion of the wavelength range with the strongest intensity. In some examples, the strongest intensity may be at the edge of the wavelength range.

The revision of the position of the prism 308 to the number of sensors 310, in some embodiments, can include moving 336 at least one of the number of sensors 310 in a horizontal or vertical direction. For instance, the horizontal or vertical direction, as used herein, can include a horizontal or vertical direction relative to the prism 308. Based on the revised position, the prism 308 can refract light in a revised wavelength range.

Although the embodiments of FIGS. 2 and 3 illustrate moving the number of sensors 210, 310 and/or the prism 208, 308 in horizontal or vertical directions, embodiment in accordance with the present disclosure are not so limited. For example, the number sensors 210, 310 and/or the prism 208, 308 can be moved vertically, horizontally, and/or diagonally, among other directions, relative to one another.

The computing component 338 can determine a revised threshold intensity from a number of portions of the revised wavelength range. For example, the number of sensors 310 and/or a second sensor among the number of sensors 310 can scan refracted light in the revised wavelength range (e.g., after the position of the prism 308 and/or the number of sensors 310 is revised) and convert the scanned refracted light into a signal for each of the number of portions of the revised wavelength range. The computing component 338 can determine the revised threshold intensity from the number of signals of the number of portions of the revised wavelength range.

The rotation 334-1, 334-2, 334-3 of the prism 308 and/or the movement of the number of sensors 310 can be accomplished using one or more motor components (e.g., not illustrated in the embodiment of FIG. 3). For example, the one or more motor components can include an actuator. A motor component can be instructed by the computing component 338 to move 336 the number of sensors 310 in a horizontal or vertical direction relative to the prism 308 to revise the position of the prism 308 and/or the number of sensors 310 based on the threshold intensity (e.g., strongest intensity). Alternatively and/or in addition, a motor component can be instructed by the computing component 338 to rotate 334-1, 334-2, 334-3 the prism 308 about an axis (e.g., for scanning through the wavelength range using the number of sensors 310).

Any of the above information, data, and/or images can be saved along with the number of images as metadata and/or a data file which can be available for later image processing and/or other purposes.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of some embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the some embodiments of the disclosure includes any other applications in which the above structures and methods are used. Therefore, the scope of some embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for multi-wavelength flame scanning, comprising:
   sensing, using a sensor, a first wavelength range of refracted light emitted from a flame;
   revising, using a computing component including a memory and a processor coupled to the memory, a position of a prism and the sensor based on the sensing of the first wavelength range; and
   sensing, using the sensor after revising the position of the prism and the sensor, a second wavelength range of refracted light emitted from the flame.

2. The method of claim 1, including refracting light emitted from the flame using the prism.

3. The method of claim 1, wherein the method includes iteratively determining, by the computing component, a revised threshold intensity of the flame and revising, by the computing component, the position of the sensor over a period of time.

4. The method of claim 1, wherein revising the position includes moving the sensor in a horizontal direction relative to the prism.

5. The method of claim 1, wherein revising the position includes moving the sensor in a vertical direction relative to the prism.

6. The method of claim 1, wherein revising the position of the sensor includes moving the sensor through a spectrum of the second wavelength range.

7. A flame scanner system for multi-spectrum flame scanning, comprising:
  a prism configured to refract light emitted from a flame;
  a sensor configured to sense the refracted light in a wavelength range; and
  a computing component including a memory and a processor coupled to the memory configured to revise a position of the prism and the sensor based on the sensed refracted light.

8. The flame scanner system of claim 7, wherein the sensor is configured to sense the refracted light in a revised wavelength range after the position of the prism and the sensor is revised.

9. The flame scanner system of claim 8, wherein the wavelength range and the revised wavelength range are non-overlapping wavelength ranges.

10. The flame scanner system of claim 7, wherein the sensor is configured to sense the refracted light in the wavelength range while and after the prism is rotated about an axis.

11. The flame scanner system of claim 7, wherein the prism is configured to move in a horizontal direction relative to the sensor.

12. The flame scanner system of claim 7, wherein the prism is configured to move in a vertical direction relative to the sensor.

13. A flame scanner system for multi-wavelength flame scanning, comprising:
  a prism configured to refract light emitted from a flame;
  a number of sensors, wherein each of the number of sensors is configured to:
    sense the refracted light in a wavelength range; and
    convert the sensed refracted light into a signal for each of a number of portions of the wavelength range; and
  a computing component including a memory and a processor coupled to the memory configured to:
    determine a strongest intensity of the number of portions of the wavelength range based on the converted signals; and
    revise a position of at least one of the prism and the number of sensors based on the strongest intensity.

14. The flame scanner system of claim 13, wherein the prism is configured to:
  refract light emitted from the flame in the wavelength range prior to the revised position of at least one of the prism and the number of sensors; and
  refract light emitted from the flame in a revised wavelength range after the revised position of at least one of the prism and the number of sensors.

15. The flame scanner system of claim 14, wherein the computing component is configured to determine a revised strongest signal from the revised wavelength range.

16. The flame scanner system of claim 15, wherein the computing component is configured to:
  instruct a first sensor among the number of sensors to sense refracted light in the wavelength range; and
  instruct a second sensor among the number of sensors to sense refracted light in the revised wavelength range.

17. The flame scanner system of claim 16, wherein the computing component is configured to:
  determine the first sensor is configured to sense refracted light in the wavelength range; and
  determine the second sensor is configured to sense refracted light in a wavelength range corresponding to the strongest intensity.

18. The flame scanner system of claim 13, further including a motor component, wherein the computing component is configured to:
  instruct the motor component to move the prism in a horizontal direction relative to the number of sensors to revise the position of the prism based on the strongest intensity.

19. The flame scanner system of claim 13, further including a motor component, wherein the computing component is configured to:
  instruct the motor component to move the number of sensors in a horizontal direction relative to the prism to revise the position of the number of sensors based on the strongest intensity.

20. The flame scanner system of claim 13, wherein the computing component is configured to revise the position of a single sensor among the number of sensors, wherein the single sensor is configured to sense refracted light in a wavelength range corresponding to the strongest intensity.

* * * * *